US006826845B2

(12) United States Patent
Pritchard

(10) Patent No.: US 6,826,845 B2
(45) Date of Patent: Dec. 7, 2004

(54) MARKING TAPE MEASURE

(76) Inventor: Gary Pritchard, 212 E. Stuart, Fort Collins, CO (US) 80525

( * ) Notice: Subject to any disclaimer, the term of this patent is extended or adjusted under 35 U.S.C. 154(b) by 0 days.

(21) Appl. No.: 10/788,786

(22) Filed: Feb. 27, 2004

(65) Prior Publication Data

US 2004/0168335 A1 Sep. 2, 2004

Related U.S. Application Data

(60) Provisional application No. 60/451,359, filed on Feb. 27, 2003.

(51) Int. Cl.[7] .............................. B44D 3/38; G01B 3/10
(52) U.S. Cl. ........................................... 33/414; 33/760
(58) Field of Search ........................... 33/414, 760, 767

(56) References Cited

U.S. PATENT DOCUMENTS

| | | | |
|---|---|---|---|
| 862,139 A | * 8/1907 | Darrow | ........................ 33/760 |
| 997,803 A | * 7/1911 | Giffin | ........................... 33/414 |
| 3,063,157 A | 11/1962 | Keene | |
| 3,191,308 A | * 6/1965 | Lindeau | ........................ 33/414 |
| 4,438,538 A | 3/1984 | Larsen | ......................... 33/451 |
| 4,697,349 A | 10/1987 | Lee | ............................ 33/27.03 |
| 4,765,557 A | * 8/1988 | Kahmann | ..................... 33/414 |
| 4,976,048 A | * 12/1990 | Blackman | .................... 33/767 |
| 4,999,924 A | 3/1991 | Shields | |
| 5,699,622 A | * 12/1997 | Umbro | ......................... 33/414 |
| 6,612,046 B1 | 9/2003 | Cimorell et al. | |

* cited by examiner

Primary Examiner—Christopher W. Fulton
(74) Attorney, Agent, or Firm—Krajec Patent Offices, LLC; Russell S. Krajec

(57) ABSTRACT

A marking device for making layout marks on surfaces such as boards, panels, or walls including a tape measure with a plurality of holes disposed along its length is disclosed. The device also contains a reel for dispensing a chalk line wherein the chalk line is positioned over the tape measure. The chalk line may be tensioned and snapped to transfer chalk through the holes, thereby providing marks at predetermined intervals.

12 Claims, 6 Drawing Sheets

US 6,826,845 B2

MARKING TAPE MEASURE

CROSS REFERENCE TO RELATED APPLICATIONS

This application claims the benefit of U.S. Provisional Patent Application 60/451,359 entitled "Marking Tape Measure" by Gary Pritchard filed Feb. 27, 2003, the entire content of which is hereby incorporated by reference herein for all it discloses and teaches.

BACKGROUND OF THE INVENTION a. Field of the Invention

The present invention pertains to measuring devices and specifically to measuring devices capable of making markings.

b. Description of the Background

Framers and construction workers typically have to measure and mark boards and panels during the layout and construction of buildings. Typically, the markings for building studs may occur every sixteen or twenty-four inches. The markings are routinely laid out by extending a tape measure and marking at periodic intervals with a pencil. The task of marking boards and panels is time consuming, as it requires traversing the entire length of a board to make the required marks.

For example, in the case where the top of an unfinished wall is to be marked, the framer may have to move a ladder every three or four feet along the wall in order to make the required layout marks to attach roofing trusses or the like. Every few feet, the framer may have to set up a ladder, climb the ladder, make the few marks that are within arm's reach, descend the ladder, move the ladder, and repeat the process.

It would therefore be advantageous to provide a system and method for creating markings on surfaces, such as boards, panels, or walls at specific intervals in a fast and efficient manner. It would further be advantageous if the system and method were compact, portable, and easy to use in difficult places.

SUMMARY OF THE INVENTION

The present invention overcomes the disadvantages and limitations of the prior art by providing a system and method for placing marks on surfaces including boards, panels, or walls in specific intervals in a single operation. A tape measure and chalk line dispenser allows the simultaneous extension of a measuring tape and chalk line. The measuring tape has a plurality of holes disposed along the tape at the specific intervals for marking. The chalk line is disposed above the tape and is tightened and snapped to create chalk marks through the holes and onto the board or panel. The tape and chalk line may then be rewound.

The tape may have a series of offset holes near the end of the tape that may allow a carpenter to offset the tape and thus the markings by a specific interval. Such offsets may be helpful in certain situations.

An embodiment of the present invention comprises a device for making at least one mark comprising: a length of tape having at least one hole disposed along the length at a predetermined location; a line disposed along the length such that at least a portion of the line spans the at least one hole; and a marking medium attached to the line.

Another embodiment of the present invention comprises a device for marking a plurality of marks comprising: means for masking having a plurality of holes disposed along the length of the means for masking at predetermined intervals; and means for dispensing a marking medium disposed along the length of the means for masking and further positioned such that at least a portion of the marking medium passes through the plurality of the holes.

Yet another embodiment of the present invention comprises a method for making at least one mark on a surface comprising: extending a tape having at least one hole over the surface; spanning the at least one hole with a marking line having a marking medium; withdrawing the marking line from the tape; allowing the marking line to snap onto the tape such that at least some of the marking medium passes through the at least one hole onto the surface.

The advantages of the present invention are that markings at specific intervals may be made with one motion. Further, the markings may be made from one end of the board without requiring traversing the length of the board to make a mark at every interval.

DETAILED DESCRIPTION OF THE INVENTION

Figure 1:
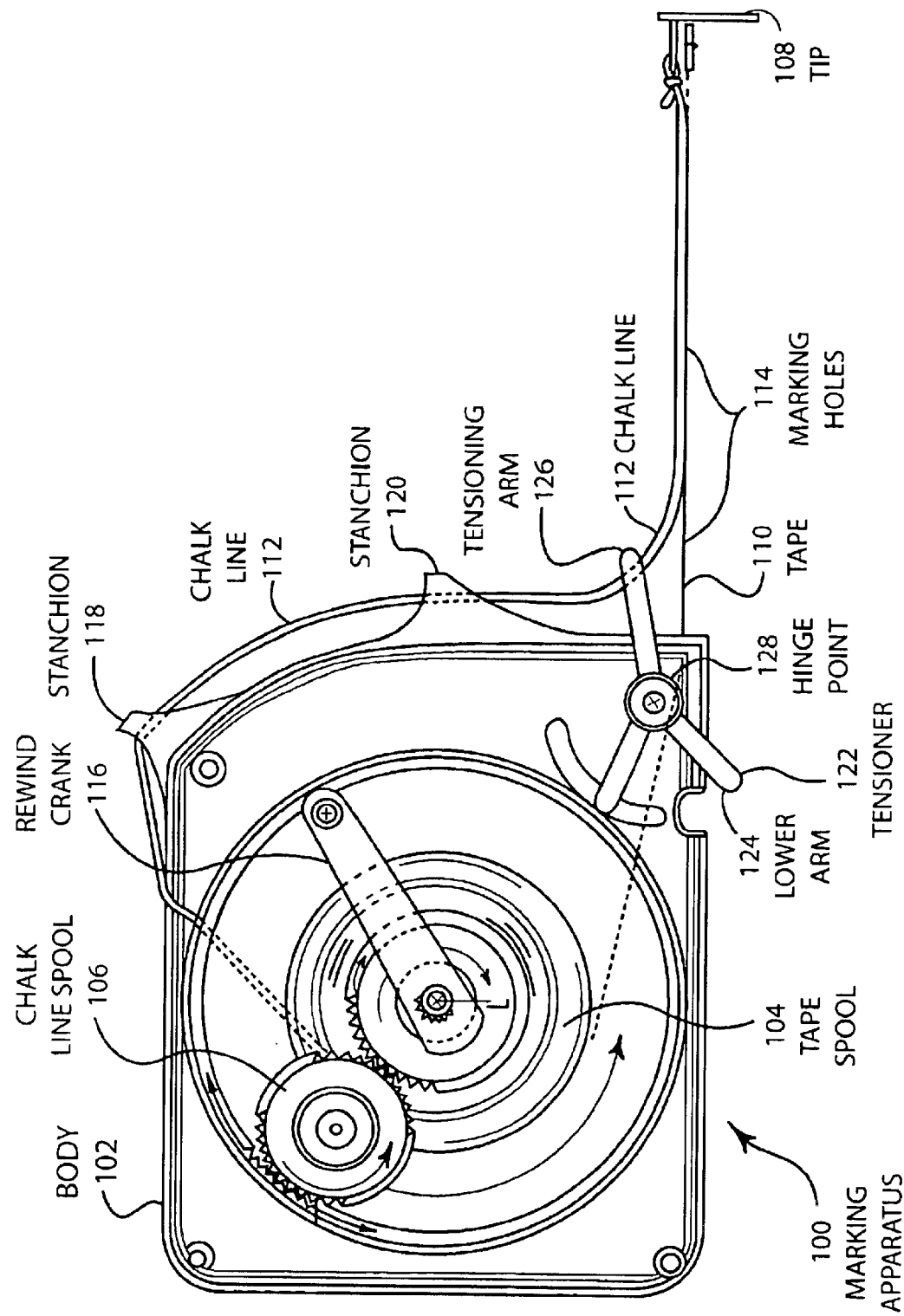
FIG. 1 is a partial cut away side view illustration of an embodiment of the present invention of a marking apparatus.

FIG. 1 illustrates a cut away side view of an embodiment 100 of a marking apparatus. The body 102 contains a tape spool 104 and a chalk line spool 106. As the free end tip 108 is pulled away from the body 102, the tape 110 and chalk line 112 are extended with the chalk line 112 being located over or spanning the tape 110. The tape 110 has a series of marking holes 114 at predetermined intervals. The tape 110 and chalk line 112 can be simultaneously retracted into the body 102 by the rewind crank 116. The chalk line 112 travels through holes in stanchions 118 and 120 and tensioner 112.

In operation, one places the tip 108 of the device over the edge of a surface to be marked, then extends the tape 110 and chalk line 112 simultaneously along the length to be marked. When the tape in the marking apparatus 100 is extended over the length to be marked, the body 102 may be placed on top of the surface such that the lower arm 124 of the tensioner 112 is pressed against the surface. The tensioner 112 forces the chalk line 112 against the tape with the tensioning arm 126. The exposed chalk line 112 is stretched between stanchions 118 and 120 with one hand and the chalk line 112 is lifted and quickly released against the tape 110 with the other hand, allowing the chalk line to return to its normal position in a process known as 'snapping the line.' The chalk dust that is supported on the chalk line 112 transfers through the marking holes 114 and make marks on the board at those intervals.

The tape 110 may be a standard metal measuring tape that has markings typical to commercially available measuring tapes. The tape 110 may be constructed of steel or other metal, or may be constructed of plastic or other suitable material.

The marking holes 114 may be placed at periodic intervals that may be useful to those of the building trades. For example, it is common to mark studs and other building components on sixteen or twenty four inch intervals. Thus, the marking holes 114 may be placed at those intervals. In addition, it is often necessary to offset those intervals by a standard amount, such as one half of the width of a stud. Additional offset holes may be provided near the tip 108 to offset the marking holes 114. A nail may be placed in the board and one of the offset holes may be placed over the nail to offset the markings a particular distance. For example, an offset of three-quarters of an inch may be desirable for laying out stud placement. A nail may be placed in the end of the board and an offset hole that is three-quarters of an inch from the tip 108 may be placed over the nail. Thus, for the entire length of the tape, all of the markings can be offset by three quarters of an inch. Other offsets may be accomplished by providing offset holes at predetermined locations along the tape. In another embodiment, the tape 110 may have a series of offset holes through which a nail may be inserted. The nail may then be placed over the edge of a board to offset the markings made by the embodiment 100. In still other embodiments, the tip 108 may be movable such that it may be adjusted to different positions along the axis of the tape 110 in order to offset the marks made by the embodiment 100.

The chalk line 112 may be a common string that is stored on a chalk line spool 106. The chalk line spool 106 may be enclosed by a chalk compartment in which chalk is stored and by which chalk may become entrained by the string. In other embodiments, the string may be replaced by a woven band with a width greater than its thickness that may be able to produce marks wider than would be possible with a string.

The marking holes 114 may be small circular holes or may be a specially shaped hole that may produce a specially shaped mark. Such shapes may include numerical shapes that may mark the location with a numerical designation. In other embodiments, the marking holes 114 may include a mark for the edge of a stud or other building member and a second mark or designation for the side to which the stud is to be placed. It is common for a carpenter to mark a location with a line or crow's foot mark and then place an 'X' to designate the appropriate side of the line for the stud. Such marks may be placed by an embodiment of the present invention having an 'X' shaped hole.

The tensioner 112 operates by rotating about the hinge point 128. As the body 102 is placed upon a surface, the lower arm 124 causes the tensioner 122 to rotate and slightly stretch the chalk line 112 with the tensioning arm 126. In some embodiments, the amount of tension applied by the tensioning arm 126 may be sufficient to snap the chalk line 112 and effectively place marks along the board. In other embodiments, the carpenter may push the body 102 against the board and pull the chalk line 1112 taught by pulling on the chalk line 112 in the area between the stanchions 118 and 120.

The rewind crank 116 may be used to retract the tape 110 and chalk line 112 into the body 102. The rewind crank 116 may be connected to the tape spool 104 and chalk line spool 106 by various gears, pulleys, or other mechanisms such that the tape 110 and chalk line 112 may be retracted substantially simultaneously. In other embodiments, a return spring may be used in place of the rewind crank 116. In such embodiments, the tape spool 104 and chalk line spool 106 may be connected by a mechanism that allows for the simultaneous retraction of the tape 110 and chalk line 112.

Figure 2:
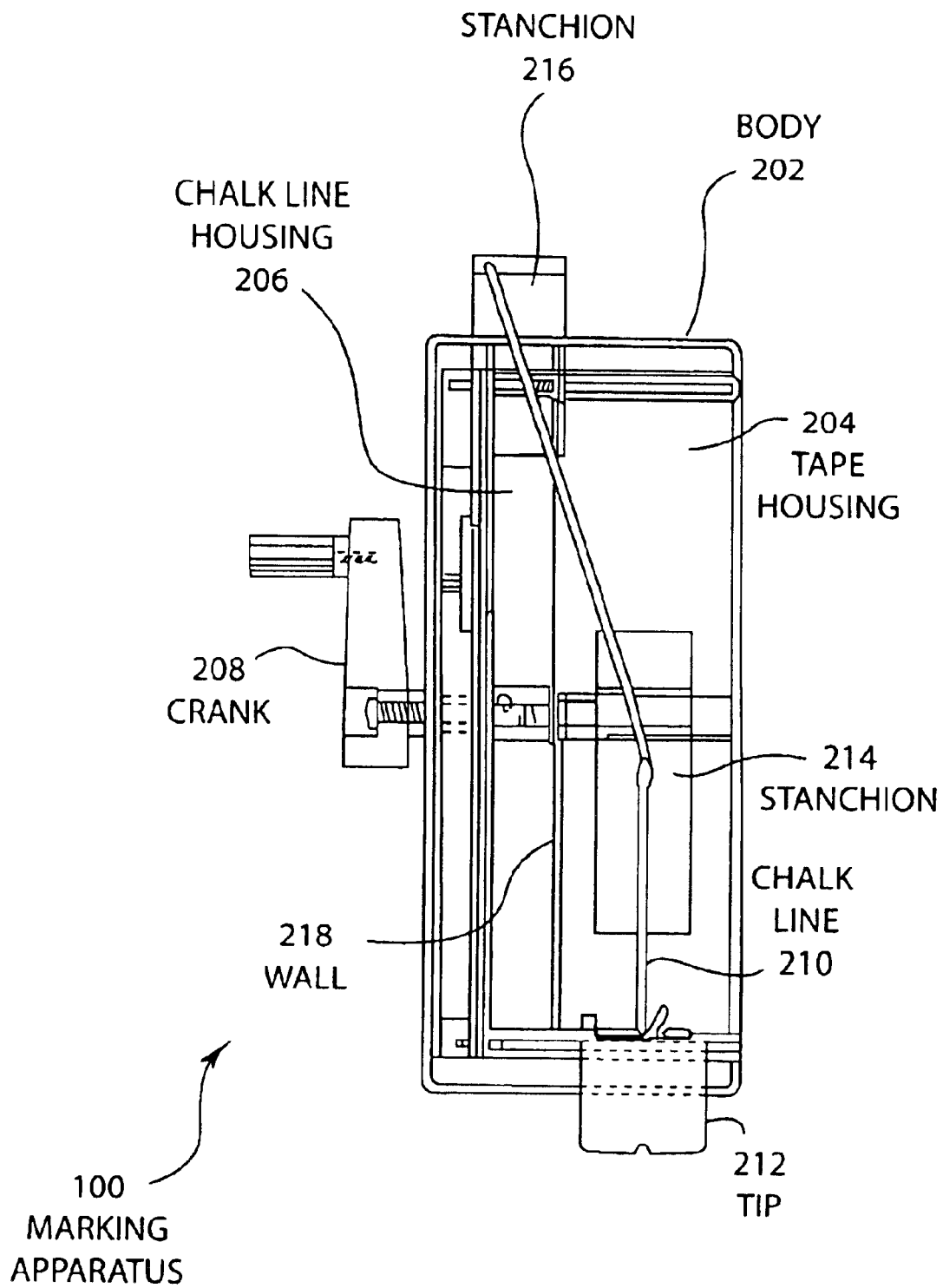
FIG. 2 is a partial cut away front view illustration of the embodiment of a marking apparatus shown in FIG. 1.

FIG. 2 is a partial cut away front view of the embodiment 100 of a marking apparatus. The body 202 has a tape housing 204 and a chalk line housing 206. The return crank 208 is mounted so that it can retract the chalk line and tape into the body 202. The chalk line 210 is fed through stanchions 214 and 216 to the tip 212. The wall 218 separates the chalk line housing 206 from the tape housing 204. The chalk line housing 206 may have a door into which may poured a quantity of chalk dust. The chalk dust may then become entrained on the chalk line 210.

Various embodiments may have different mechanisms for handling the chalk dust. For example, wipers and mechanisms of various sorts may be employed to remove excess chalk dust from the tape or chalk line. Such mechanisms regulate the amount of chalk that is entrained on the chalk line and to clean the tape during rewind to prohibit chalk dust from collecting inside the tape housing 204.

Figure 3:
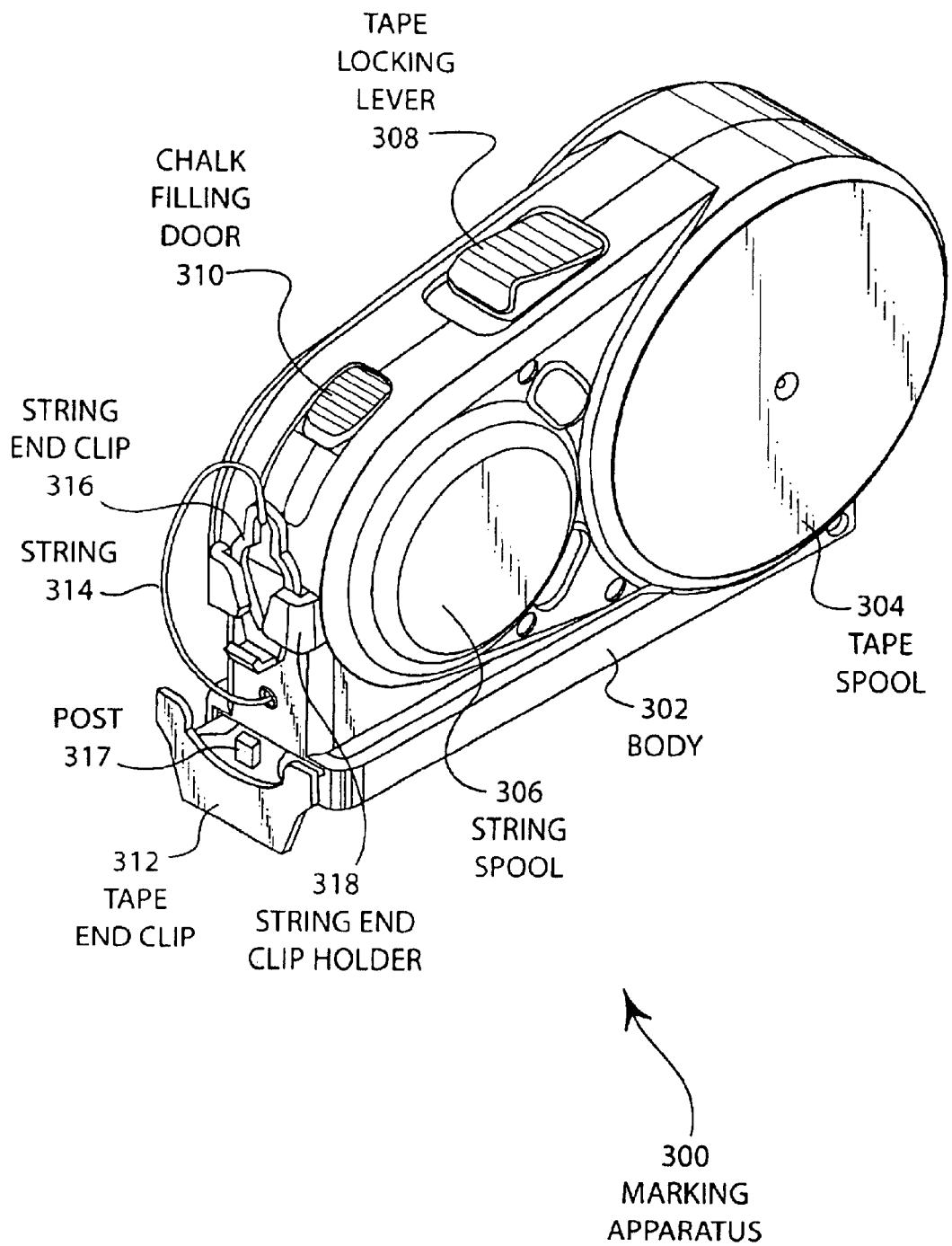
FIG. 3 is a perspective view of an embodiment of the present invention of a marking apparatus.

FIG. 3 illustrates a perspective view of an embodiment 300 of the present invention of a marking apparatus. The body 302 contains a tape spool 304 and a string spool 306. A tape locking lever 308 allows the tape to be locked in a particular position. A chalk filling door 310 may be opened to receive powdered chalk that can be carried on the string 314. The free end of the tape 312 may be hooked over the edge of a piece of wood or other article to be measured or marked. The string end clip 316 may be engaged on the post 317 when the device is used as a marking instrument.

The embodiment 300 may be used as a separate tape measure and string line. For example, to use the embodiment 300 as a tape measure, the string end clip 316 may be disengaged from the tape end clip 312 and stored in the string end clip holder 318. The tape may be extended from the tape spool 304 by pulling on the tape end clip 312. The tape may be an elongated sheet of metal or plastic and may have graduations, marks, or other indicia for measuring or otherwise indicating distance. Similarly, the tape may be kept in the retracted position and the string may be extended to mark or indicate a straight line.

Figure 4:
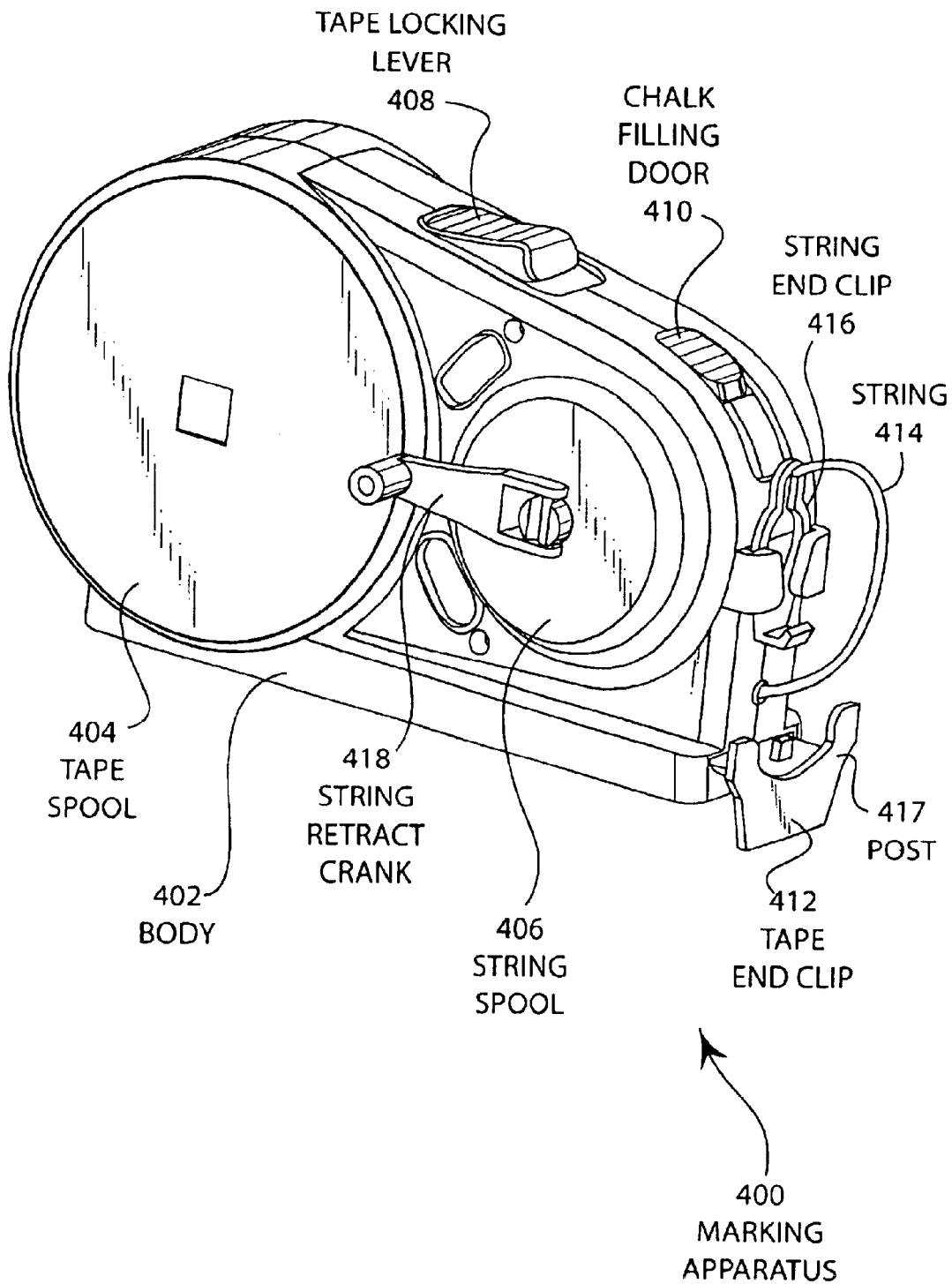
FIG. 4 is a perspective view of the embodiment of the present invention of a marking apparatus shown in FIG. 3.

FIG. 4 illustrates a perspective view of an embodiment 400 of the present invention of a marking apparatus. The body 402 contains a tape spool 404 and a string spool 406. A tape locking lever 408 may lock the tape in a particular position. A chalk filling door 410 may be opened to receive powdered chalk or other marking medium that can be carried on the string 414. The tape end clip 412 has a post 417 that may receive the string end clip 416.

The embodiment 400 contains a string retract crank 418 that may engage the string spool 406 to retract the string 414 into the body 402. In some embodiments, the crank 418 may engage the string spool directly or may engage the spool by means of gears.

In some embodiments, the tape may be retracted by a spring mechanism. In some embodiments, the string and the tape may be retracted simultaneously and collectively by a gear mechanism between the tape spool and the string spool. In other embodiments, the tape and the spring may be retracted separately and using separate devices. For example, the tape may be retracted with a spring powered mechanism while the string is retracted by a hand crank mechanism. Various retraction mechanisms may be used by those skilled in the art while keeping within the spirit and intent of the present invention.

The string 414 may carry chalk or other marking medium and may be used to transfer the marking medium to an article to be marked. In some instances, the string may contain powdered chalk, powdered ink, liquid ink, or other marking fluid or powder.

Figure 5:
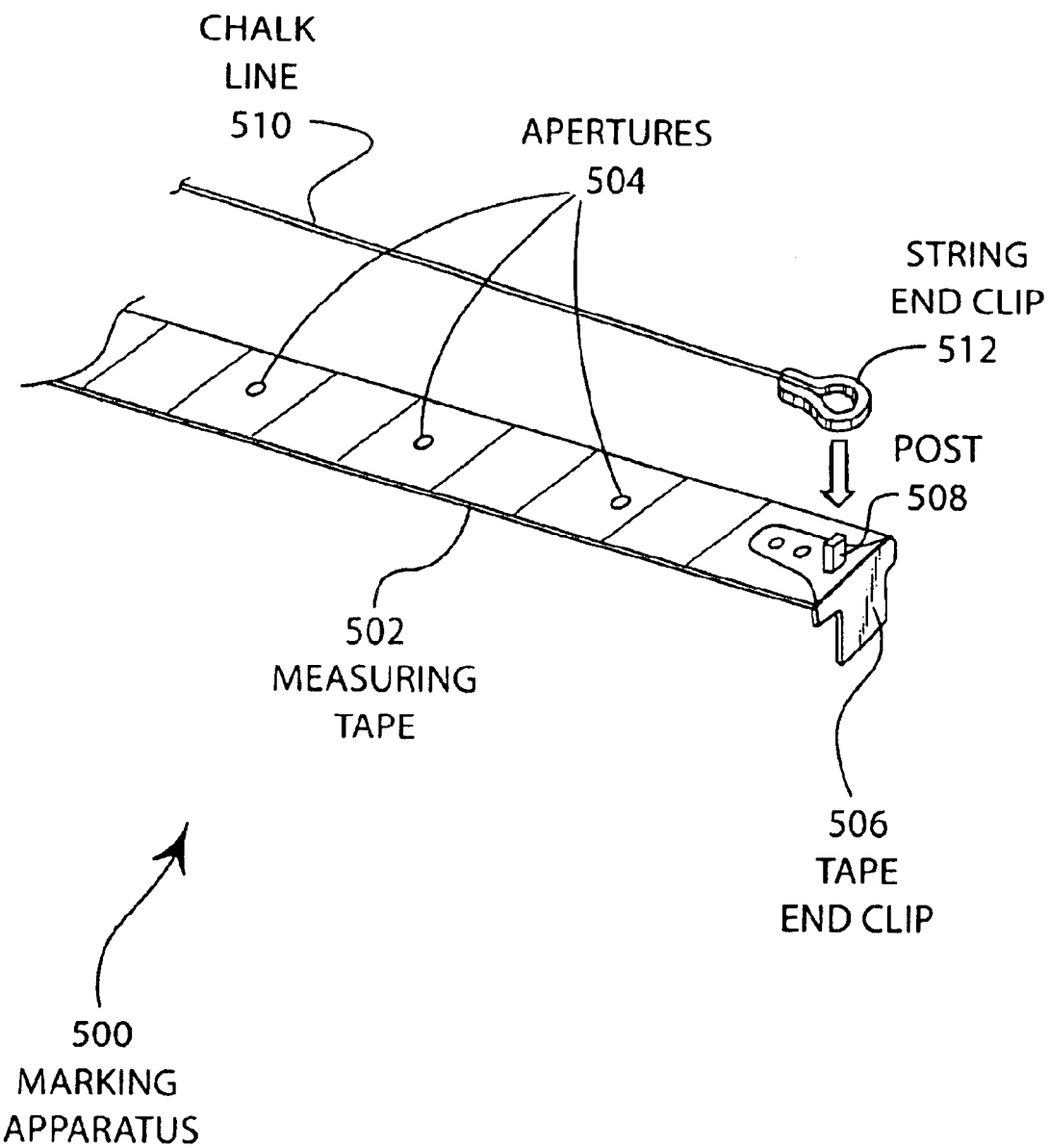
FIG. 5 is a perspective view of an embodiment of the present invention of a marking apparatus showing the marking components.

FIG. 5 illustrates a perspective view of an embodiment 500 of the present invention of a marking apparatus. A measuring tape 502 contains a plurality of apertures 504 at predetermined intervals or other spacing. The tape clip 506 may be hooked over the edge of an article to mark. A chalk line 510 may be placed over the tape 502 by engaging the string end clip 512 over the post 508 of the tape end clip 506. The string 510 is placed directly on top of the tape 502, spanning the apertures 504. When the string 510 is made taught, the chalk line 510 may be raised and released quickly to transfer the marking medium carried by the chalk line 510 through the apertures 504 and onto the item to be marked. This process is sometimes called 'snapping a line' in the trade.

The apertures 504 may be selected to be of various shapes, sizes, and spacing to indicate various distances or marks as those skilled in the art may desire. For example, for framing houses in the United States, it may be conventional to mark studs at 16 inches apart. In such a case, the apertures 504 may be spaced 16 inches apart. In some cases, the shape of an aperture 504 may have a special meaning, such as the stud side of a mark.

In some cases, the measuring tape 502 may have various marks or indicia for measuring distance or other functions as desired.

Figure 6:
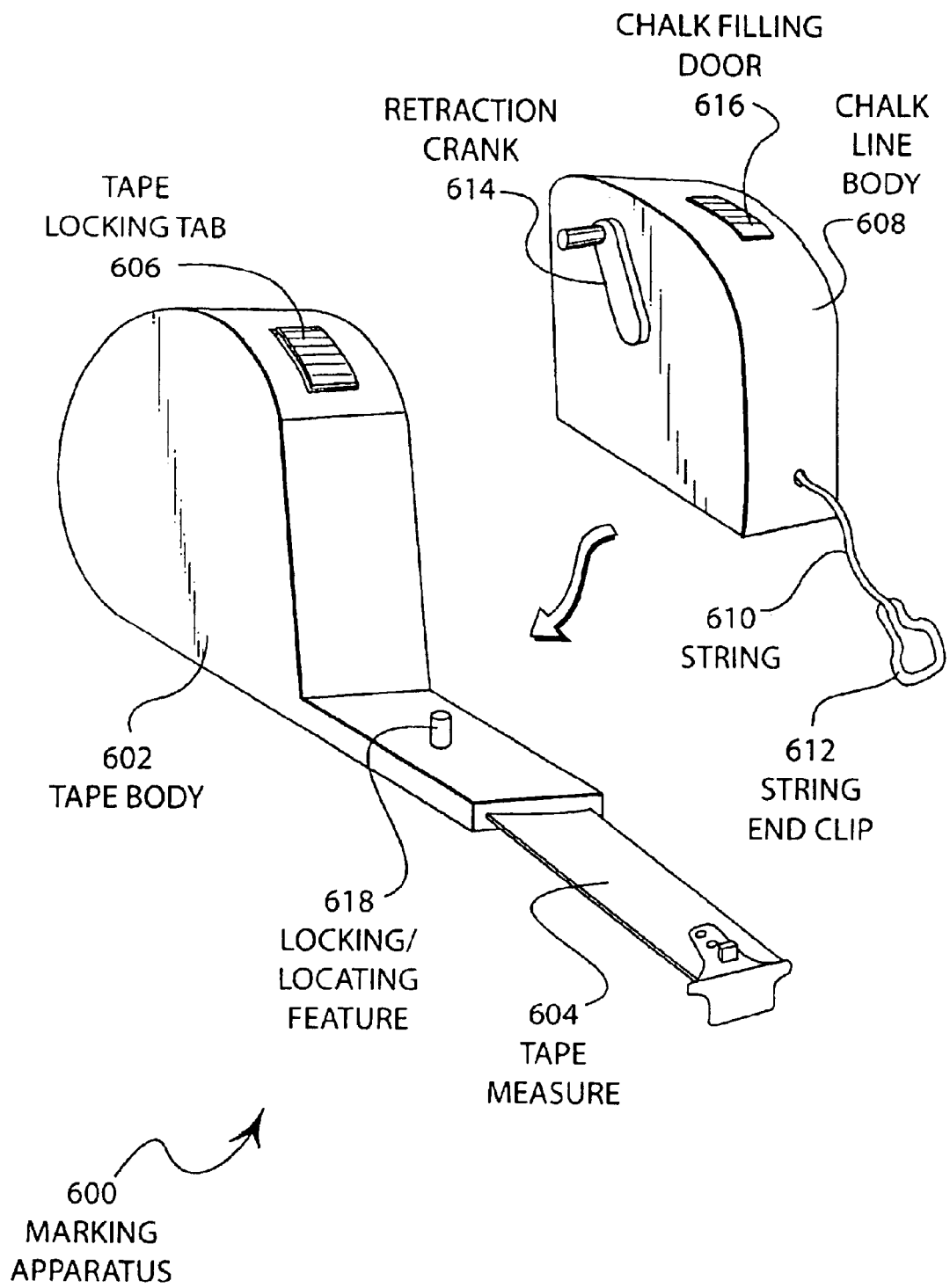
FIG. 6 is a perspective view of an embodiment of the present invention of a marking apparatus having detachable components.

FIG. 6 is a perspective view of an embodiment 600 of the present invention of a marking apparatus. A tape body 602 contains a tape 604 and a tape locking tab 606. A chalk line body 608 contains a string 610, a string end clip 612, a retraction crank 614, and a chalk filling door 616. The chalk line body 608 may removably engage the tape body 602 with a locking/locating feature 618.

The embodiment 600 allows the string line body 608 to be removed and separately used from the tape body 602, but be recombined in order to use apertures in the tape 604 to mask the chalk line 610 to make separate, distinct marks along the length of the tape 604. For example, the chalk line 610 may be used for marking a straight line while the tape measure 602 may be used to measure a certain distance. After such time, the chalk line 610 may be reattached to the tape measure 602 and used to mark a plurality of points along a distance.

Various locating and locking mechanisms 618 may be used by those skilled in the art while keeping within the spirit and intent of the present invention. For example, the tape measure 602 and the chalk line 610 may snap together, may lock together using a mechanical linkage, may slidingly engage each other, or any other type of releasable engagement device or mechanism.

The foregoing description of the invention has been presented for purposes of illustration and description. It is not intended to be exhaustive or to limit the invention to the precise form disclosed, and other modifications and variations may be possible in light of the above teachings. The embodiments were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A device for marking a plurality of marks comprising:
   means for masking having a plurality of holes disposed along the length of said means for masking at predetermined intervals; and
   means for dispensing a marking medium disposed along the length of said means for masking and further positioned such that at least a portion of said marking medium passes through said plurality of said holes.

2. The device of claim 1 wherein said means for masking comprises a free end and means for dispensing is attached to said free end of said means for masking.

3. The device of claim 1 wherein said means for masking comprises indicia at chosen locations.

4. The device of claim 1 wherein said means for masking comprises a free end and said means for dispensing comprises a line tip, said line tip adapted to removably engage said free end of said means for masking.

5. The device of claim 1 further comprising:
   first means for storing at least a portion of said means for masking; and
   second means for storing at least a portion of said means for dispensing.

6. The device of claim 5 further comprising a spring retraction mechanism adapted to retract said means for masking onto said first means for storing.

7. The device of claim 5 further comprising a lock mechanism adapted to lock said means for masking.

8. The device of claim 5 further comprising a crank handle engaged to said second means for storing adapted to retract said means for dispensing onto said second means for storing when said crank handle is actuated.

9. The device of claim 8 wherein said crank handle is further adapted to retract said means for masking onto said first means for storing when said crank handle is actuated.

10. The device of claim 1 further comprising a means for dispensing chalk onto said means for dispensing.

11. The device of claim 1 further comprising a means for dispensing ink onto said means for dispensing.

12. The device of claim 1 having a first compartment comprising first means for storing and a second compartment comprising said second means for storing wherein said first compartment and said second compartment are separable.

* * * * *